United States Patent
Fox et al.

(10) Patent No.: US 6,924,322 B2
(45) Date of Patent: Aug. 2, 2005

(54) THIO-,AMINE-,NITRO-,AND MACROCYCLIC CONTAINING ORGANIC AEROGELS & XEROGELS

(75) Inventors: Glenn A. Fox, Brentwood, CA (US); Thomas M. Tillotson, Tracy, CA (US)

(73) Assignee: The Regents of the University of California, Oakland, CA (US)

( * ) Notice: Subject to any disclaimer, the term of this patent is extended or adjusted under 35 U.S.C. 154(b) by 210 days.

(21) Appl. No.: 10/393,492

(22) Filed: Mar. 18, 2003

(65) Prior Publication Data

US 2004/0186191 A1 Sep. 23, 2004

(51) Int. Cl.$^7$ .................................................. C08J 9/00
(52) U.S. Cl. ........................ 521/181; 521/185; 521/186; 521/187; 521/188; 521/189
(58) Field of Search .................................. 521/181, 185, 521/186, 187, 188, 189

(56) References Cited

U.S. PATENT DOCUMENTS 4,154,621 A * 5/1979 Burke et al. ................ 523/200
4,194,920 A * 3/1980 Burke et al. ................ 523/200
4,966,919 A * 10/1990 Williams et al. ............... 521/54
5,037,859 A * 8/1991 Williams et al. ............... 521/55

* cited by examiner

*Primary Examiner*—Morton Foelak
(74) *Attorney, Agent, or Firm*—Ann M. Lee; Alan H. Thompson; Eddie E. Scott

(57) ABSTRACT

An organic aerogel or xerogel formed by a sol-gel reaction using starting materials that exhibit similar reactivity to the most commonly used resorcinol starting material. The new starting materials, including thio-, amine- and nitro-containing molecules and functionalized macrocyclic molecules will produce organic xerogels and aerogels that have improved performance in the areas of detection and sensor technology, as well as water stream remediation. Also, further functionalization of these new organic aerogels or xerogels will yield material that can be extracted with greater facility than current organic aerogels.

12 Claims, No Drawings

THIO-, AMINE-, NITRO-, AND MACROCYCLIC CONTAINING ORGANIC AEROGELS & XEROGELS

The United States Government has rights in this invention pursuant to Contract No. W-7405--ENG-48 between the United States Department of Energy and the University of California for the operation of Lawrence Livermore National Laboratory.

BACKGROUND OF THE INVENTION

Aerogels are a unique class of ultrafine cell size, low density, open-cell foams. Aerogels have continuous porosity and a microstructure composed of interconnected colloidal-like particles or polymeric chains with characteristic diameters of 100 angstrom. The microstructure of aerogels is response for their unusual acoustic, mechanical, optical and thermal properties. The mircrostructure imparts high surface areas to aerogels, for example, from about 350 $m^2/g$ to about 1000 $m^2/g$. The ultra fine cell/pore size minimizes light scattering in the visible spectrum, and thus they can be prepared as transparent, porous solids. Further, the high porosity of aerogels makes them excellent insulators.

Traditional aerogels are inorganic (for example, silica, alumina or zirconia aerogels), made via the hydrolysis and condensation of metal alkoxides, for example, tetramethoxy silane.

Recently, organic aerogels from the sol-gel polymerization of resorcinol (1,3 dihydroxy benzene) with formaldehyde under alkaline condition have been developed as disclosed in U.S. Pat. No. 4,873,218 issued Oct. 10, 1989, and U.S. Pat. No. 4,997,804 issued Mar. 5, 1991. Also, organic aerogels that are transparent and essentially colorless have been prepared from the aqueous, sol-gel polymerization of melamine with formaldehyde, see U.S. Pat. No. 5,086,085 issued Feb. 4, 1992. In addition, organic aerogels have been produced using precursor materials which include polyacrylonitrile (PAN), polymethylacrylonitrile (PMAN), cathechol/formaldehyde, phenol/formaldehyde, etc., or mixtures thereof, see U.S. Pat. No. 5,476,878 issued Dec. 19, 1995, U.S. Pat. No. 5,556,892, issued Sep. 17, 1006, No. 5,731,360 issued Mar. 24, 1998, U.S. Pat. No. 5,744,510 issued Apr. 28, 1998, and U.S. Pat. No. 5,932,185 issued Aug. 3, 1999. All the above-referenced US patents are hereby incorporated by reference.

Typically, these organic aerogels are formed by a sol-gel reaction of a precursor material solution in water, to which is added a base catalyst to initiate the reaction. The resultant gel is then dried, either by repetitive solvent exchange, or by supercritical extraction. If the gel can be dried in such a fashion that capillary forces will not collapse the structure, an aerogel is the result, and if not a xerogel is formed.

SUMMARY OF THE INVENTION

An aspect of the invention includes an improvement in a process for fabricating organic aerogels and xerogels utilizing sol-gel processing. The improvement comprising: utilizing a starting material selected from the group consisting of thio-containing molecules, amine-containing molecules, nitro-containing molecules, and functionalized macrocyclic molecules.

A further aspect of the invention includes an improvement in a sol-gel process for producing aerogels utilizing resorcinol starting material. The improvement comprising: substituting a 1,3-difunctionalized benzene derivative other than resorcinol for the resorcinol starting material, wherein said 1,3-difunctionalized benzene derivative exhibits similar reactivity to that of the resorcinol starting material.

Another aspect of the invention includes a sol-gel process for fabricating aerogels and xerogel utilizing a melamine-formaldehyde sol-gel reaction, the improvement comprising: substituting functionalized macrocycles in place of melamnine.

Another aspect of the invention includes a sol-gel process using starting materials containing molecular molecules selected from the group consisting of thio-, amine-, and nitro-containing molecules, and wherein incorporation of these starting materials is carried out via the following reaction:

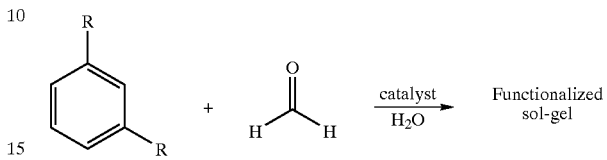

where R=an electron-withdrawing moiety.

Another aspect of the invention includes an aerogel or xerogel containing molecules selected from the group consisting of thio-, amine-, and nitro-containing molecules.

Another aspect of the invention includes an aerogel or xerogel containing functionalized macrocyclic molecules.

DETAILED DESCRIPTION OF THE INVENTION

The present invention relates to aerogels and xerogel, particularly to starting materials for sol-gel processing, and more particular to new types of starting materials that will provide improved performed in the areas of detection and sensor technology as well as waste stream remediation. Also, further functionalization of these new organic aerogels will yield material that can be extracted with greater facility than current organic aerogels.

When the sol-gel reaction is carried out in water, hydrogen bonding between the solvent and resultant gel is a major problem. Removal, functionalization or replacement of the hydrophobic hydroxyl moieties, when resorcinol is used, would greatly enhance the ease of gel drying or solvent exchange.

Further, functionalization of the hydroxyl groups with hydrophobic groups such as methyl, has been ineffective. Functionalization, besides making solvent exchange an easier procedure, could also lead to new aerogel materials that have been designed with certain specificity, or for unique chemical applications. With the low chemical reactivity of the existing hydroxyl groups in the resorcinol-formaldehyde (RF) gels, further functionalization is not readily possible.

The present invention replaces the previously used limited number of starting molecules, including resorcinol, melamine, furfural, catechol and phenol with new starting materials. These include thio-, amine- and nitro-containing molecules and functionalized macrocyclic molecules which will produce organic aerogels and xerogels that will have improved performance in the areas of detection and sensor technology as well as waste stream remediation. Also, further functionalization of these new organic aerogels will yield material that can be extracted with greater facility than current organic aerogels.

Disclosed herein are aerogels and xerogels produced by sol-gel processing. Thio-containing, amine-containing, nitro-containing, and macrocyclic-containing starting materials replace resorcinol in sol-gel processing reactions. The new starting materials exhibit similar reactivity to resorcinol and include thio-, amine- and nitro-containing molecules and functionalized macrocyclic molecules. Utilization of these new starting materials produce organic aerogels and xerogels that have improved performance in the areas of detection and sensor technology as well as in waste stream remediation.

As previously stated, functionalization of the hydroxyl groups with hydrophobic groups such as methyl, has been ineffective. For example, the hydroxyl groups in the resorcinol-formaldehyde (RE) gels have low chemical reactivity, and thus, further functionalization is not readily possible. However, further functionalization of the organic aerogels using the starting materials disclosed herein can yield materials that can be extracted with greater facility than the organic aerogels previously known.

Incorporation of the thio-containing, amine-containing, nitro-containing, and macrocyclic-containing starting materials into sol-gels is done via (but not limited to) the following reaction:

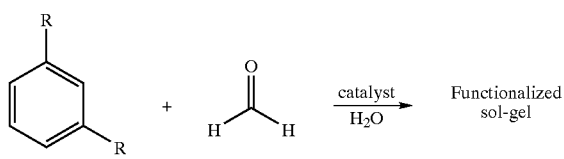

Where R=SH, $NH_2$, $NO_2$, $CF_3$, $CO_2H$, NF2, etc. This reaction utilizes the "resorcinol like" 1,3-difunctionalized benzene derivatives.

The moiety R is not limited to the functional groups identified above. Other electron-withdrawing moieties can also be incorporated into the sol-gel structure.

A second method of functionalization substitutes functionalized macrocycles in place of melamine in the melamine-formaldehyde sol-gel reaction. A "macrocycle" as used herein is any heterocyclic species containing a certain combination of heteroatoms, usually oxygen, nitrogen and sulfur, but not limited to those atoms. Incorporation of functionalized macrocycles yields materials without the conjugation of melamine, and therefore results in sol-gels having less colored than similar melamnine-formaldehyde gels. In addition, incorporation of the functionalized macrocycles in the sol-gel structure produces a site for metal ligation or for ligation of some other reactive species. Incorporation of a functionalized macrocycle in sol-gel reaction is set forth as follows:

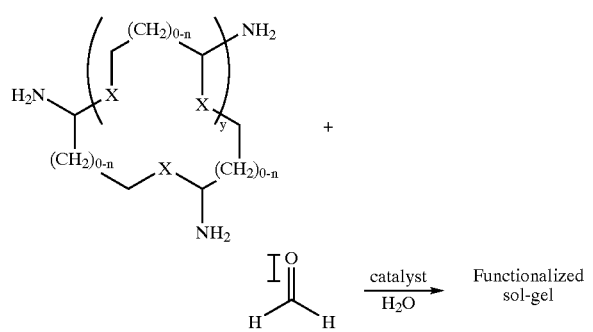

Where n-number of atoms in carbon backbone; x=heteroatom, including but not limited to: O, N, S; and y=number of units in macrocycle.

While particular embodiments of the invention have been described, along with particular materials, etc., to exemplify and teach the principles of the invention, such are not intended to be limiting. Modifications and changes may become apparent to those skilled in the art, and it is intended that the invention be limited only by the scope of the appended claims.

What is claimed is:

1. In a sol-gel process for producing resorcinol-formaldehyde aerogels, the improvement comprising: substituting a 1,3-difunctionalized benzene derivative other than resorcinol for the resorcinol starting material, wherein said 1,3-difunctionalized benzene derivative exhibits similar reactivity to that of the resorcinol starting material.

2. The improvement of claim 1, wherein said 1,3-difunctionalized benzene derivative material is selected from the group consisting of thio-containing molecules, amine-containing molecules and nitro-containing molecules.

3. The improvement of claim 1, wherein said 1,3-difunctionalized benzene derivative is functionalized with at least one electron-withdrawing moietie.

4. The improvement of claim 3, wherein said electron-withdrawing moietie is SH, $SH_2$, $NO_2$, $CF_3$, $CO_2H$, or $NF_2$.

5. In a sol-gel process for fabricating aerogels and xerogel utilizing a melamine-formaldehyde sol-gel reaction, the improvement comprising:
substituting functionalized macrocycles in place of melamine.

6. The improvement of claim 5, wherein said functionalized macrocyclic molecules are defined as any heterocyclic species containing a combination of heteroatoms including oxygen, nitrogen, and sulfur.

7. The improvement of claim 5, wherein the macrocycles comprise any heterocyclic species containing combinations of heteroatoms.

8. The improvement of claim 7, wherein the heteroatoms are selected from the group consisting of oxygen, nitrogen and sulfur.

9. The improvement of claim 5, wherein the substituting of functionalized macrocycles is carried out by the following reaction:

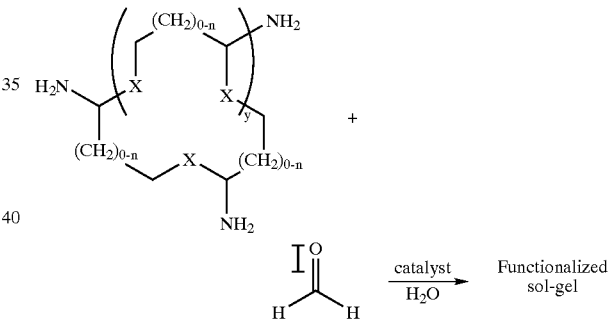

wherein n=number of atoms in carbon backbone, x=heteroatom, and y=number of units in macrocycle.

10. The improvement of claim 9, wherein the heteroatom is selected from the group consisting of oxygen, nitrogen, and sulfur.

11. A sol-gel process using starting materials containing molecular molecules selected from the group consisting of thio-, amine-, and nitro-containing molecules, and wherein incorporation of these starting materials is carried out via the following reaction:

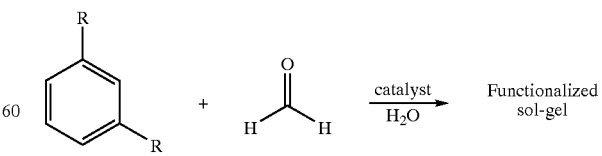

where R=an electron-withdrawing moiety.

12. The sol-gel process of claim 11, where R is SH, $NH_2$, $NO_2$, $CF_3$, $CO_2H$, or $NF_2$.

* * * * *